United States Patent
Packer et al.

(10) Patent No.: US 6,862,642 B1
(45) Date of Patent: Mar. 1, 2005

(54) EXPANDER DEVICE AND METHOD FOR RESETTING BUS SEGMENTS IN I/O SUBSYSTEM SEGMENTED WITH EXPANDERS

(75) Inventors: John S. Packer, San Jose, CA (US); Lawrence J. Lamers, San Jose, CA (US)

(73) Assignee: Adaptec, Inc., Milpitas, CA (US)

( * ) Notice: Subject to any disclaimer, the term of this patent is extended or adjusted under 35 U.S.C. 154(b) by 443 days.

(21) Appl. No.: 09/858,321

(22) Filed: May 15, 2001

(51) Int. Cl.$^7$ .......................... G06F 13/00; G06F 13/36; G06F 12/16; H03K 19/03
(52) U.S. Cl. ........................ 710/300; 710/312; 326/9; 711/100
(58) Field of Search ................................. 710/300, 312, 710/305, 2, 313; 714/23; 361/68; 326/82

(56) References Cited

U.S. PATENT DOCUMENTS

| | | | | |
|---|---|---|---|---|
| 5,274,783 A | * | 12/1993 | House et al. ................ | 710/300 |
| 5,819,104 A | * | 10/1998 | Tuccio .......................... | 710/2 |
| 5,996,038 A | * | 11/1999 | Looi et al. ................... | 710/312 |
| 5,999,389 A | * | 12/1999 | Luebke et al. ................ | 361/68 |
| 6,448,810 B1 | * | 9/2002 | Nomura ........................ | 326/82 |
| 6,519,713 B1 | * | 2/2003 | Wada ............................ | 714/23 |
| 6,567,879 B1 | * | 5/2003 | Benson et al. .............. | 710/305 |
| 6,636,921 B1 | * | 10/2003 | Scholhamer et al. ........ | 710/305 |

FOREIGN PATENT DOCUMENTS

| | | | | |
|---|---|---|---|---|
| JP | 03184109 A | * | 8/1991 | G06F/1/24 |
| JP | 07281994 A | * | 10/1995 | G06F/13/36 |
| JP | 09022395 A | * | 1/1997 | G06F/13/36 |
| JP | 2000181809 A | * | 6/2000 | G06F/13/00 |

OTHER PUBLICATIONS

IBM Technical Disclosure Bulletin, "Power Sequence Independent Expansion Bus Interface", TDB–ACC–NO: NN8606425, published by IBM, vol. 29, Issue No. 1, pp. 425–426, on Jun. 1, 1986.*

* cited by examiner

*Primary Examiner*—Glenn A. Auve
*Assistant Examiner*—Christopher E. Lee
(74) *Attorney, Agent, or Firm*—Martine & Penilla, LLP

(57) ABSTRACT

Expander device and method for resetting bus segments in I/O subsystem to clear bus hang in an I/O subsystem having a plurality of bus segments. Each bus segment in the I/O subsystem includes a set of devices and a bus that is coupled to the set of devices. In addition, the I/O subsystem includes at least one expander, each expander being arranged to couple a pair of buses for propagating communication signals. A reset signal is asserted on a first bus segment. In response to the reset signal, each expander coupled to the first bus segment and each device in the first bus segment reset themselves. Additionally, each expander coupled to the first bus segment isolates the reset signal such that the reset signal is not propagated to the other bus segments. For each expander coupled to the first bus segment, all communication signals are isolated such that each expander prevents propagation of the communication signals between the first bus and other bus. Then, it is determined whether the other bus is no longer hung for each expander coupled to the first bus segment. If the other bus is still hung, each expander issues a far-side reset signal on the other bus to reset the other bus. However, if the other bus is not hung, communication signals are allowed to propagate between the first bus and the other bus.

18 Claims, 6 Drawing Sheets

EXPANDER DEVICE AND METHOD FOR RESETTING BUS SEGMENTS IN I/O SUBSYSTEM SEGMENTED WITH EXPANDERS

BACKGROUND OF THE INVENTION

1. Field of the Invention

This invention relates generally to computer I/O subsystems having peripheral bus segments, and more particularly to a device and method for resetting bus segments in I/O subsystems that are segmented with expanders.

2. Description of the Related Art

Modern computer systems often utilize one or more buses to connect to peripheral devices to enhance its resources. For example, the resources of a computer system may be substantially increased by connecting the computer system to one or more peripheral devices such as disk drives, tape drives, printers, scanners, optical drives, and the like. These peripheral devices are attached to the computer system by means of a peripheral bus (e.g., cable).

One of the most widely used peripheral buses is the well known small computer systems interface (SCSI) bus, which is defined in conformity with well known SCSI protocols (e.g., SCSI-1, SCSI-2, SCSI-3, etc.), which are incorporated herein by reference. The SCSI protocols are designed to provide an efficient peer-to-peer I/O interface between a host computer and its peripheral devices in a computer system.

FIG. 1 shows a block diagram of a conventional computer system 100 including a host computer 102, a plurality of SCSI devices 106, and an SCSI bus 108. The host computer 102 includes an SCSI host adapter 104 for communicating with the SCSI devices 106. The host adapter 104 in the computer system 100 controls communication between the host computer 102 and the SCSI devices 106. For example, the host adapter 104 provides a physical connection between the host computer 102 and the SCSI bus 108. In addition, it is configured to receive data, address, and control signals from the host computer 102 and convert the signals into corresponding SCSI compatible data, address, and control signals. Conversely, the SCSI host adapter 104 is also configured to receive SCSI compatible data, address, and control signals from the SCSI devices 106 through the SCSI bus 108 and convert them into corresponding host-bus compatible data, addressing, and control signals. The SCSI host adapter 104 is well known in the art and may be implemented, for example, by using AIC-7890A™ packaged semiconductor device, which is available from Adaptec Inc., of Milpitas, Calif.

Under the conventional SCSI specifications, the SCSI bus 108 may connect up to 16 SCSI devices including the host adapter 104 depending on the type of SCSI bus implemented. The SCSI devices 106 may be peripheral devices such as disk drives, tape drives, printers, scanners, optical drives, or any other devices that meet the SCSI specification. The SCSI bus 108 is typically implemented as a cable having a set of parallel wires. For example, the SCSI-1 cable has 50 wires. Of these 50 wires, eight wires are for data, one wire is for parity, nine wires are for control, 25 wires are for ground, and the remaining wires are for power or are reserved for future use. The eight data wires are used to carry eight bits of data in parallel. In general, conventional SCSI bus cables include either 8 or 16 data wires for carrying 8 or 16 bits, respectively, of data in parallel. The data wires in the bus thus define a datapath for communicating bits equal to the number of data wires in the bus.

A traditional SCSI bus may accommodate a plurality of SCSI devices up to a maximum number equal to the number of data bits in the SCSI bus. In practice, the width of the SCSI datapath is typically 8 or 16 bits corresponding to the number of data wires in the SCSI bus. This means the maximum number of SCSI devices, including a host adapter, that can be attached to an SCSI bus is limited to 8 or 16.

Conventional SCSI buses, however, are generally capable of transmitting signals reliably for a specified cable length only. For example, SCSI bus cables conforming to SCSI specifications are typically limited to a maximum length such as 3, 6, 12, or 25 meters, and the like. In modern computer systems such as servers that need to communicate with numerous SCSI devices, some SCSI peripheral devices may be located more than the specified cable length away from a host computer.

In such instances, an expander, which is essentially a repeater, is typically used to add another SCSI bus, which is then used to couple additional SCSI devices. FIG. 2 illustrates a conventional I/O subsystem 200 that includes an expander 214 for connecting a pair of SCSI bus segments 208 and 210. In the I/O subsystem 200, a host computer 202 is coupled to the SCSI bus segment 208 via an SCSI host adapter 204. One or more SCSI devices 206 are coupled to the SCSI bus segment 208. Additionally, one or more SCSI devices 212 and a host computer 216 are coupled to the SCSI bus segment 210 and the host computer 202 also includes an SCSI adapter for communicating with the SCSI bus segment 210. The expander 214 is coupled between the SCSI bus segments 208 and 210 to regenerate signals received on either SCSI bus segments 208 or 210 for transmission to the other SCSI bus segment. By so repeating signals, the expander 214 functions to extend the length of the overall SCSI bus so that additional SCSI devices 212, host computer 216, or other expanders can be attached to the SCSI bus segment 210.

During the operation of the I/O subsystem, however, an SCSI device may not function properly and hang the SCSI bus. For example, the SCSI device 206A may malfunction while accessing the bus segment 210 and continue to assert BSY signal on the bus segment 210. Because the expander 214 repeats the BSY signal onto the other bus segment 208, the SCSI device 206A hangs the entire I/O subsystem, thus preventing other devices from accessing the bus segments.

When the SCSI bus is hung, the conventional SCSI protocols typically provide a reset signal RST to reset the bus devices. For example, the host computer 202 may issue a RST signal over SCSI bus segment 208 to the devices 206A and 206B. In this case, however, the expander also causes the RST signal to propagate to all devices 212A and 212B in the I/O subsystem 200 and cause those devices to reset due to the repeating function of the expander 214. Thus, all devices and expanders in the I/O subsystem will be reset.

Resetting of all devices and expanders is undesirable because the devices may have queued commands for execution. Upon reset, these queued commands will be lost. This is particularly undesirable if there are multiple initiators. In addition, when an I/O subsystem is segmented with many expanders with substantial number of devices, resetting all devices to clear the hang condition caused by a single malfunctioning device may entail substantial time and loss of system resources.

In view of the foregoing, what is needed is an expander device and method for resetting individual bus segments in an I/O subsystem one segment at a time to clear a hang condition without resetting all devices in the I/O subsystem.

SUMMARY OF THE INVENTION

The present invention fills these needs by providing an expander device and method for resetting bus segments to clear bus hang in an I/O subsystem segmented with expanders. It should be appreciated that the present invention can be implemented in numerous ways, including as a process, an apparatus, a system, a device, a method, or a computer readable medium. Several inventive embodiments of the present invention are described below.

In one embodiment, the present invention provides a method for resetting bus segments to clear bus hang in an I/O subsystem having a plurality of bus segments. Each bus segment in the I/O subsystem includes a set of devices and a bus that is coupled to the set of devices. In addition, the I/O subsystem includes at least one expander, each expander being arranged to couple a pair of buses for propagating communication signals. In this method, a reset signal is asserted on a first bus segment. In response to the reset signal, each expander coupled to the first bus segment and each device in the first bus segment reset themselves. Additionally, each expander coupled to the first bus segment isolates the reset signal such that the reset signal is not propagated to the other bus segments. For each expander coupled to the first bus segment, all communication signals are isolated such that each expander prevents propagation of the communication signals between the first bus and other bus. Then, it is determined whether the other bus is no longer hung for each expander coupled to the first bus segment. If the other bus is still hung, each expander issues a far-side reset signal on the other bus to reset the other bus. However, if the other bus is not hung, communication signals are allowed to propagate between the first bus and the other bus.

In another embodiment, the present invention provides an expander device for isolating a reset between a pair of bus segments in an I/O subsystem with each bus segment having a set of devices and a bus that is coupled to the set of devices. The expander device is arranged to couple the buses in the bus segments for communication in the I/O subsystem. The expander device includes a first I/O interface circuit, a second I/O interface circuit, and an expander controller. The first I/O interface circuit is configured to be coupled to a first bus segment and is adapted to interface input and output communication signals with the first bus segment. The second 110 interface circuit is configured to be coupled to a second bus segment and is adapted to interface the input and output communication signals with the second bus segment. The expander controller is arranged to communicate the input and output communication signals between the first and second I/O interface circuits. Further, the expander controller is configured to control communication between the first and second bus segments. The expander controller includes a reset and segment isolation controller adapted to isolate a reset signal received on the first bus segment from propagating to the second bus segment. The expander controller isolates all signals to prevent propagation of the signals between the first and second bus segments after isolating the reset signal until the bus in the second bus segment is cleared from a hang condition.

In yet another embodiment, the present invention provides an SCSI expander for resetting bus segments to clear bus hang in an SCSI I/O subsystem. Each bus segment includes a set of devices and a bus that is coupled to the set of devices. The SCSI expander is arranged to couple a first bus in a first bus segment and a second bus in a second bus segment. The SCSI expander is further configured to repeat communication signals by receiving the communication signals from one SCSI bus segment and outputting the communication signals to the other SCSI bus segment. The SCSI expander includes a first SCSI I/O interface circuit, a second SCSI I/O interface circuit, and an SCSI expander controller. The first SCSI I/O interface circuit is adapted to interface communication signals with the first SCSI bus segment. The second SCSI I/O interface circuit is adapted to interface the communication signals with the second SCSI bus segment. The SCSI expander controller is coupled to communicate the communication signals between the first and second SCSI I/O interface circuits and is arranged to control communication between the first and second SCSI bus segments. The SCSI expander controller includes a reset and segment isolation controller adapted to isolate a reset signal received on the first bus segment from propagating to the second bus segment. The SCSI expander controller isolates all communication signals to prevent propagation of the communication signals between the first and second bus segments after isolating the reset signal until the second bus is in a BUS FREE state.

The present invention allows reset of individual bus segments in an I/O subsystem one segment at a time without the reset propagating to other bus segments until the bus hang condition is cleared. Advantageously, entering an isolation mode after reset isolation prevents a problem bus segment that is causing the bus hang condition from hanging the previously reset bus segment. When a far-side bus segment is still hung after resetting the near-side bus segment, the present invention allows reset of the far-side segment without resetting the near-side segment. When the far-side reset is issued, the expanders automatically exit segment isolation mode. The use of reset and segment isolation thus allows resetting of individual bus segments one segment at a time with attendant savings in cost and system complexity. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

The present invention provides an expander device and method for resetting bus segments in an I/O subsystem segmented with expanders. It will be obvious, however, to one skilled in the art, that the present invention may be practiced without some or all of these specific details. In other instances, well known process operations have not been described in detail in order not to unnecessarily obscure the present invention.

In an I/O subsystem segmented into multiple bus segments with expanders, the present invention allows reset of the I/O subsystem that has been hung by resetting bus segments one at a time. By way of example, the present invention isolates an SCSI bus reset by allowing one device (e.g., host computer, peripheral devices, etc.) within the subsystem to reset a segment without the reset propagating to other segments. When the device asserts a reset signal, expanders located in the same bus segment as the device prevent propagation of the reset signal to other bus segments. However, if one of the other bus segments is responsible for hanging the bus, the hang condition may not clear. To overcome such conditions, the present invention allows an expander on the bus segment to halt propagation of the reset signal and then enter into a segment isolation mode. The expander will then check the state of the other segment to determine if the segment is still hung. If the other bus segment is still hung, the expander remains in the segment isolation mode to prevent the hung bus to continue to hang the reset segment.

Figure 1:
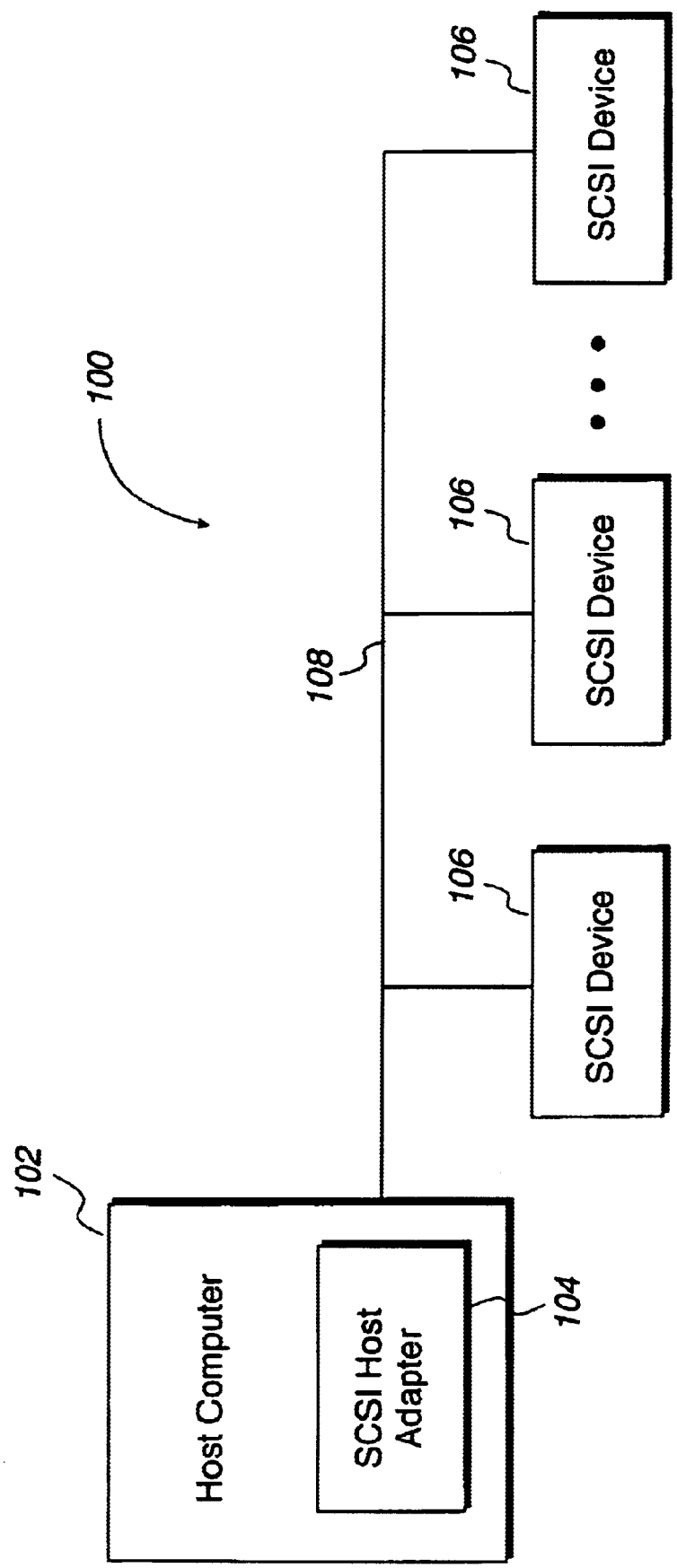
FIG. 1 shows a block diagram of a conventional computer system including a host computer, a plurality of SCSI devices, and an SCSI bus.
Figure 2:
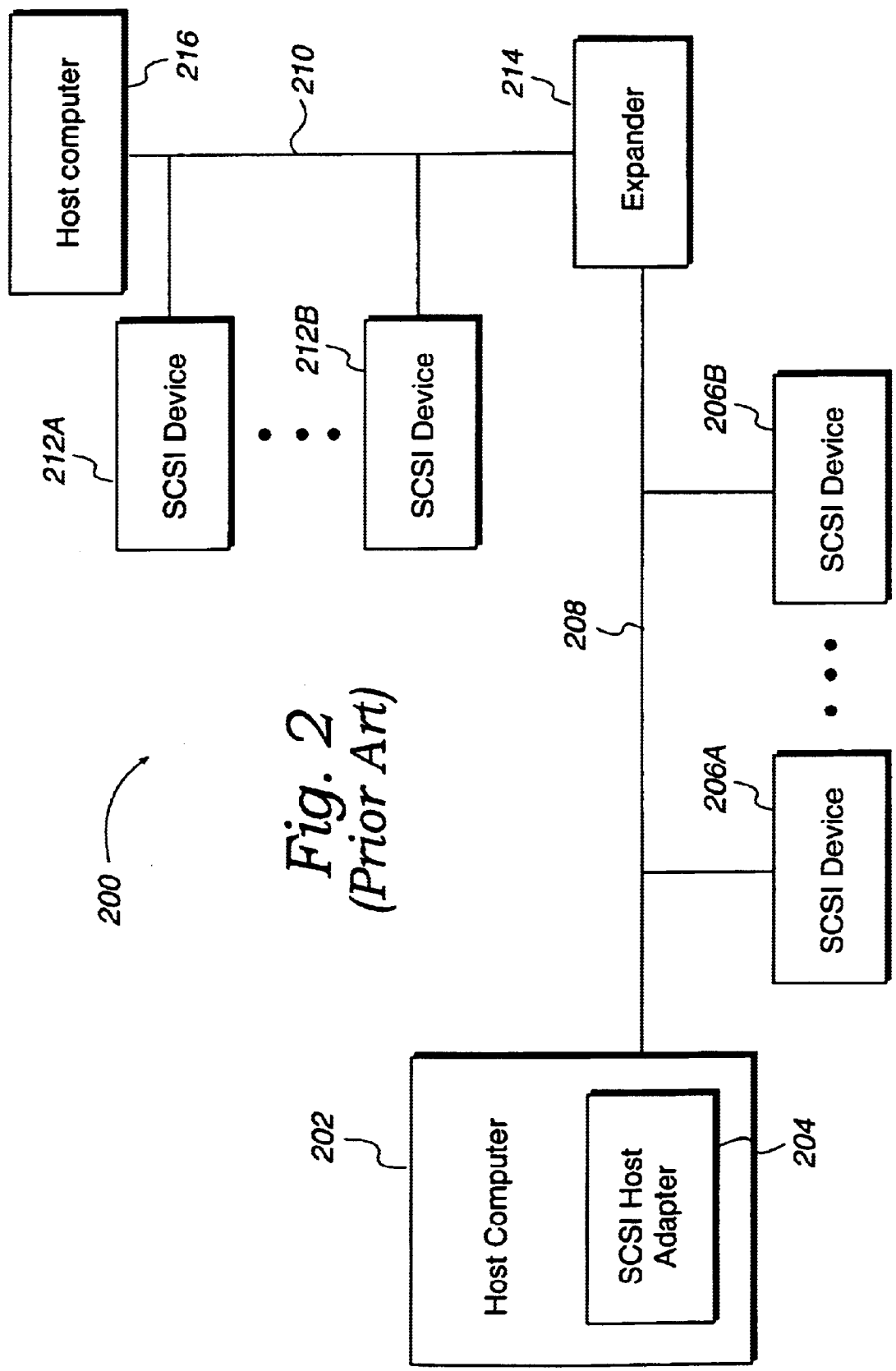
FIG. 2 illustrates a conventional computer system that includes an expander for connecting a pair of SCSI buses.
Figure 3:
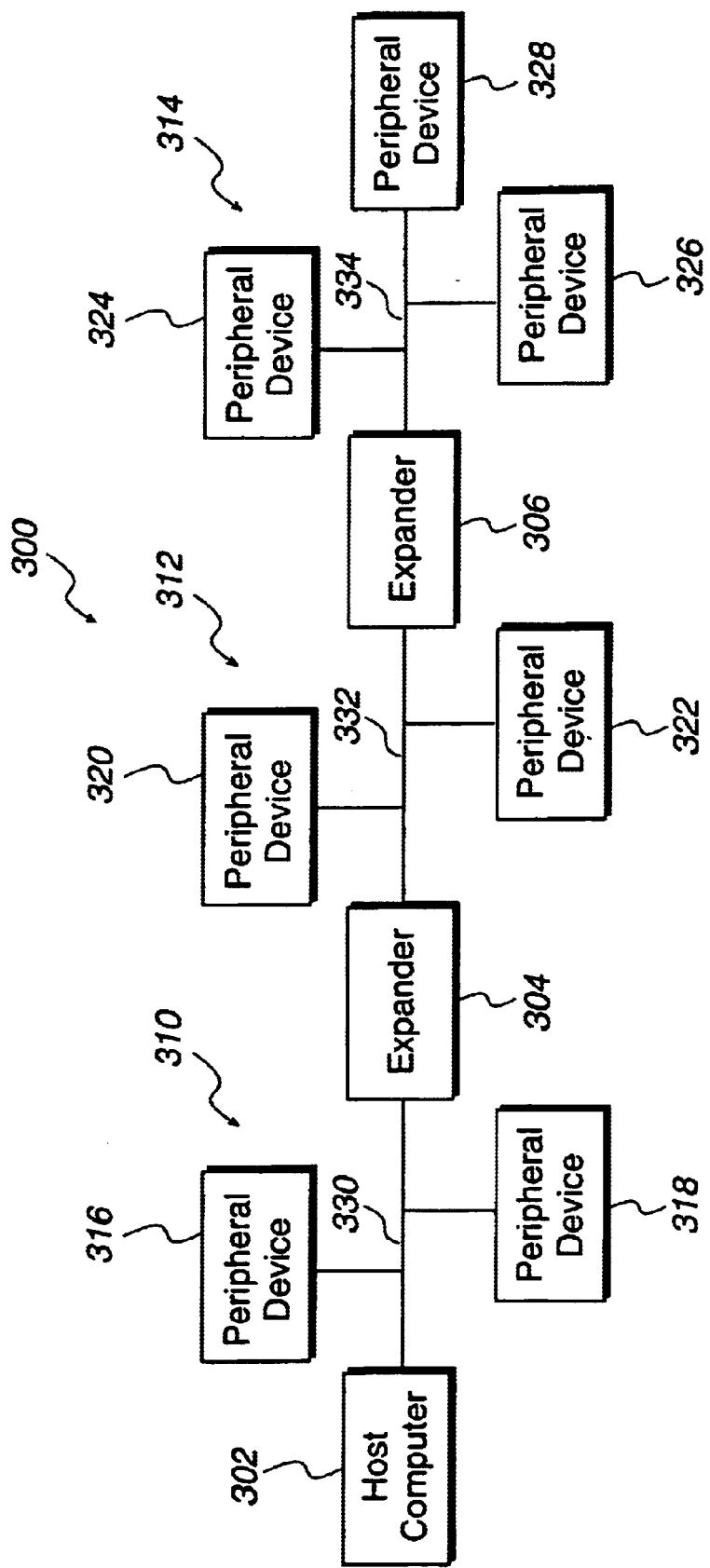
FIG. 3 illustrates an exemplary I/O subsystem that allows reset of individual bus segments using reset isolation in accordance with one embodiment of the present invention.

FIG. 3 illustrates an exemplary I/O subsystem 300 that allows reset of individual bus segments 310, 312, and 314 using reset isolation in accordance with one embodiment of the present invention. The I/O subsystem 300 includes bus segments 310, 312, and 314, which include communication buses 330, 332, and 334, respectively. Each of the bus segments 310, 312, and 314 may include a set of devices such as host computers, peripheral devices, etc. In the illustrated embodiment, the bus segment 310 includes, in addition to bus 330, a host computer 302 and peripheral devices 316 and 318. The host computer 302 and the peripheral devices 316 and 318 are coupled to the bus 330 for communication. On the other hand, the bus segment 312 includes the bus 332 and peripheral devices 320 and 322 while the bus segment 314 includes the bus 334 and peripheral devices 324, 326, and 328. The peripheral devices 320 and 322 are coupled to the bus 332 and the peripheral devices 324, 326, and 328 are coupled to the bus 334 for communication.

To allow communication among the bus segments 310, 312, and 314, expanders 304 and 306 are provided to extend the length of a bus by propagating signals received from one bus segment to another bus segment. Specifically, the expander 304 is coupled between buses 330 and 332 to propagate (i.e., repeat) communication signals received from one bus to the other. Likewise, the expander 306 is coupled between buses 332 and 334 for propagating signals received on one bus to the other. The expanders 304 and 306 thus allow the host computer 302 and the peripheral devices 316 to 328 to communicate signals in the I/O subsystem 300.

Although the present invention is illustrated using the I/O subsystem 300, it should be appreciated that the I/O subsystem 300 may include any number of expanders, bus segments, host computers, and peripheral devices. In a preferred embodiment, the I/O subsystem 300 is an SCSI bus I/O subsystem with each device, host computer, and expanders being adapted to recognize and operate under SCSI protocols. Those skilled in the art will, however, recognize that the I/O subsystem 300 may also be implemented using any other suitable in-line bus protocols.

With continuing reference to FIG. 3, during operation of the I/O subsystem 300, a peripheral device in the I/O subsystem 300 may not function properly and "hang" the bus connected to the device. In an SCSI I/O subsystem, for example, the peripheral device 320 in bus segment 312 may malfunction and hang the bus 332 by asserting and continuing to assert "BSY" signal, which indicates that the bus is being used and thus is not available for other devices. The continued assertion of the BSY signal prevents the buses 330, 332, and 334 from entering BUS FREE state, which indicate that a bus is available for arbitration. Because the expanders 304 and 306 propagate all signals to bus segments 310 and 314, the BSY signal will propagate to all the buses 330, 332, and 334. The propagated BSY signal prevents all devices including the host computer 302 and other properly operating peripheral devices from arbitrating for the bus. In so doing, all buses 330, 332, and 334 are hung and the operation of the entire I/O subsystem 300 comes to a standstill.

The expander device and method of the present invention allow reset of individual bus segments in the I/O subsystem 300 with expanders. When the bus in the I/O subsystem 300 is hung, a reset signal is issued by the host computer 302 or a properly functioning device on a bus segment. In response to the reset command, all devices (e.g., peripheral devices, host computers, etc.) and expanders on the bus segment associated with the reset issuing device are reset to clear BSY signal on the bus. In addition, each expander on the bus segment enters into reset isolation mode to stop propagation of the reset signals onto the other bus segments. Then, each expander on the bus segment of the reset issuing device enters into segment isolation mode where all signals received on one bus segment are prevented from propagating to the other bus segment.

In this segment isolation mode, each expander on the bus segment of the reset issuing device examines the other bus segment (i.e., far-side bus segment) to determine if the other bus (i.e., far-side bus) is BSY. If the far-side bus is not BSY, the device causing the hang condition must have been in the same bus segment associated with the reset issuing device. Because all devices on the reset issuing segment have already been reset to clear the BSY signal, the hang condition has been resolved and the expander exits segment isolation mode. On the other hand, if the far-side bus is BSY, a far-side reset is issued to the other bus segment to reset all devices and computers in the other bus segment. In this case, the bus segments in the I/O subsystem 300 are reset one bus segment at a time by repeating the above process, proceeding from the bus segment of the reset issuing device (i.e., near-side segment) to the most distant bus segment in the I/O subsystem 300.

Figure 4:
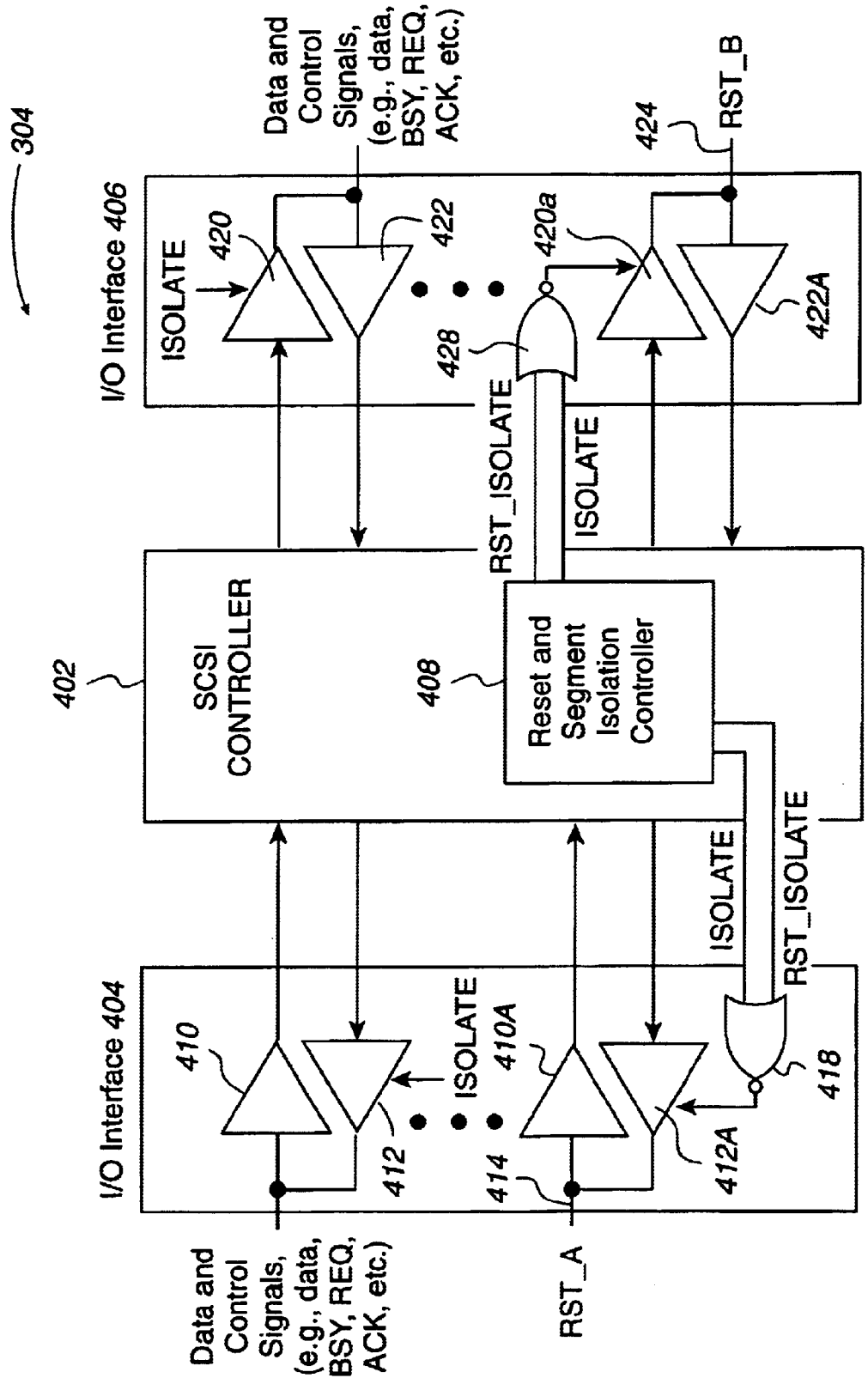
FIG. 4 shows a more detailed schematic diagram of an exemplary expander for implementing reset and segment isolation in accordance with one embodiment of the present invention.

FIG. 4 shows a more detailed schematic diagram of the expander 304 for implementing reset and segment isolation in accordance with one embodiment of the present invention. The expander 304 includes an SCSI controller 402 and I/O interfaces 404 and 406. Although the expander 304 is illustrated using an SCSI controller 402, it should be appreciated that other types of expander controllers may be used in conformance with any suitable buses such as in-line buses. In addition, the architecture in FIG. 4 is equally applicable to other expanders used in an I/O subsystem. For example, the expander architecture of the expander 304 may be used to implement the other expander 306 in the I/O subsystem 300.

The I/O interfaces 404 and 406 in the expander 304 provide interface to bus segments 310 and 312, respectively, for communicating SCSI data and control signals such as BSY, REQ, ACK, RST, etc. The I/O interface 404 is coupled between the SCSI bus 330 and the SCSI controller 402 and is adapted to drive input and output data and control signals between them. Similarly, the I/O interface 406 is coupled between the SCSI controller 402 and SCSI bus 332 to drive input and output data and control signals therebetween.

For transmitting reset signals (e.g., RST), each of the I/O interface 404 and 406 also includes a reset input buffer and a reset output buffer. For example, the I/O interface 404 includes a reset input buffer 410A and a reset output buffer 412A, which are coupled to a reset line 414 of the SCSI bus 330 to communicate a reset signal RST_A. Similarly, the I/O interface 406 includes a reset input buffer 422A and a reset output buffer 420A. These reset buffers 422A and 420A are coupled to a reset line 424 of the SCSI bus 332 for communicating a reset signal RST_B.

The SCSI controller 402 is coupled receive and/or output data and control signals to and from the buffers 410, 412, 410A, 412A, 420, 422, 420A, and 422A in the I/O interfaces 404 and 406 and is adapted to provide control functions for the expander 304. During normal operating mode, the input buffers 410 and 422 operate to drive input signals for output through output buffers 420 and 412, respectively, so that communication signals received on one bus segment are propagated onto the other bus segment. For example, when a signal is received from the bus 330, the input buffer 410 drives the signal onto the SCSI controller 402. The SCSI controller 402 then provides the signal to the output buffer 420, which drives the signal onto the bus 332. On the other hand, the input buffer 422 drives a signal received from the bus 332 onto the SCSI controller 402, which provides the signal to the output buffer 412. The output buffer 412 then drives the signal onto the bus 330. In this manner, the expander 304 repeats signals received on one bus segment to the other bus segment.

The SCSI controller 402 includes a reset and segment isolation controller 408 to control resetting of the bus segments 310 and 312 on either side of the expander 304. When a reset signal RST_A, for example, is received from bus segment 310, the input buffer 410A drives the reset signal RST_A onto the reset and segment isolation controller 408. In response, the reset and segment isolation controller 408 causes the SCSI controller to reset and enter into a reset isolation mode by issuing a reset isolation signal, RST_ISOLATE.

A pair of NOR gates 418 and 428 in the I/O interfaces 404 and 406, respectively, is arranged to receive a segment isolation signal ISOLATE and a reset isolation signal RST_ISOLATE from the reset and segment isolation controller 408. In response to the RST_ISOLATE signal, the NOR gates 418 and 428 generate signals that disable the reset output buffers 412A and 420A, respectively. The disabling of the reset output buffers 412A and 420A prevents propagation of the reset signal RST_A onto the bus segment 312 and isolates resetting of segment 310 from other segments 312 and 314 in the I/O subsystem 300. Conversely, when a reset isolation signal RST_B is received from bus segment 312, the reset and segment isolation controller 408 generates RST_ISOLATE signal to disable the reset output buffers 412A and 420A via NOR gates 418 and 428, respectively.

The reset and segment isolation controller 408 is also arranged to generate a segment isolation signal ISOLATE for isolating bus segments 310 and 312 from one another. Specifically, the segment isolation signal ISOLATE is provided to disable the output buffers 412 and 422 in the I/O interfaces 404 and 406 so that all signals received on one bus segment are not propagated to the other bus segment. By preventing signal propagation between SCSI buses 330 and 332, the expander 304 effectively isolates the bus segments 310 and 312. Segment isolation techniques are described in more detail in U.S. patent application Ser. No. 09/846,975, entitled "Expander Device and Method for Isolating Bus Segments in I/O Subsystem," which is incorporated by reference.

After entering the reset isolation mode, the reset and segment isolation controller 408 generates a segment isolation signal ISOLATE, which is provided to the output buffers 412 and 422 to disable propagation of signals received on one bus segment to the other bus segment. In addition, the segment isolation signal ISOLATE is also provided to the NOR gates 418 and 428. In response to the ISOLATE signal, the NOR gates 418 and 428 generate a signal adapted to disable the reset output buffers 412A and 420A, respectively. Accordingly, the expander 402 does not output signals onto the buses 330 and 332. It should be noted, however, that the input buffers in the I/O interfaces 404 and 406 are not disabled so that the expander 304 may continue to receive communication signals (e.g., commands, data, control signals, RST, etc.), for example, to exit from the segment and reset isolation modes. By disabling of the output functions of the I/O interfaces 404 and 406, the expander 304 effectively prevents repeating or propagation of signals received on one bus segment to the other bus segment.

Figure 5:
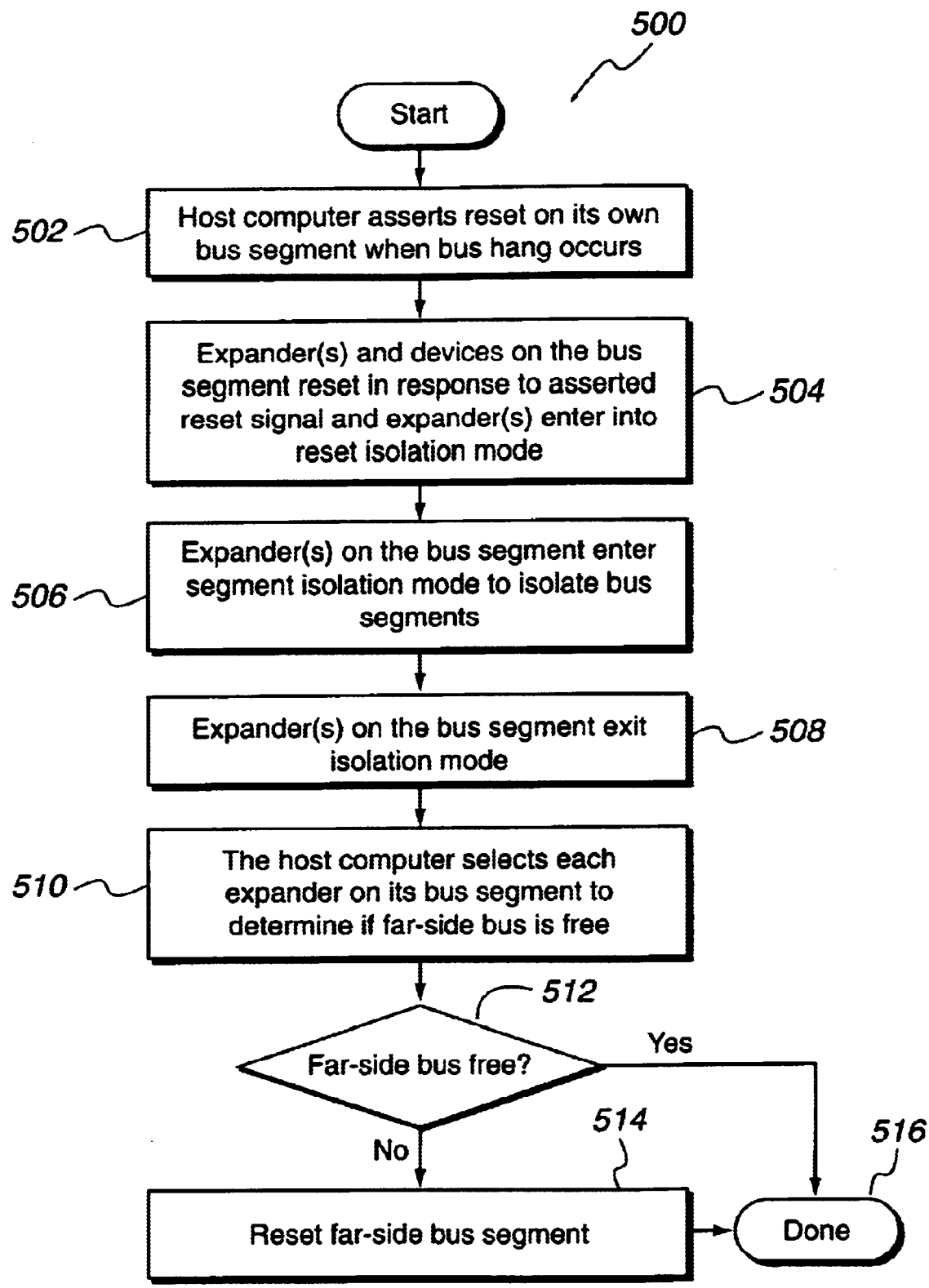
FIG. 5 shows an exemplary method implemented in the I/O subsystem for resetting bus segments one segment at a time in accordance with one embodiment of the present invention.

FIG. 5 shows an exemplary method 500 implemented in the I/O subsystem 300 for resetting bus segments one segment at a time in accordance with one embodiment of the present invention. It should be appreciated that the method 500 may be applied to I/O subsystems having any number of expanders. Further, each segment in the I/O subsystem 300 may have any number of expanders. For example, segment 310 may have, in addition to expander 304, other expanders that operate in accordance with the method 500.

With continuing reference to the method 500 in FIG. 5, when a bus hang occurs, a host computer 302 asserts a reset signal RST_A on its own bus segment 330 in operation 502. In response to the reset signal RST_A, the expander 304 and all devices 316 and 318 on the bus segment 330 reset in operation 504. The resetting of all devices in bus segment 330 causes the BSY signal on the bus 330 to clear and the bus 330 will be in BUS FREE state. In addition, the expander 304 enters into a reset isolation mode by issuing RST_ISOLATE signal to the output buffers 412A and 420A. This prevents the reset signal from propagating to other bus segments 312 and 314. It should be noted that if the device that caused the bus hang condition is located in the bus segment 312, the resetting of the bus segment 312 will clear the bus hang condition throughout the entire I/O subsystem 300. Accordingly, other bus segments 312 and 314 will not need to be reset with attendant savings in reset time and system resources.

After the bus segment 310 has been reset, the expander 304 enters, in operation 506, segment isolation mode to isolate bus segments 310 and 312 from one another. In this mode, all output buffers in the expander 304 are disabled so that no signal is output from the expander 304. The segment isolation serves to isolate segments from a segment where the device causing the bus hang condition is located. Without a segment isolation mode, the BSY signal will not clear if the device causing the bus hang condition is located in the far segments 332 or 334. The method moves to an operation 508 in which the expander 304 on the bus segment 310 then exits segment isolation mode so that the expander 304 can propagate data and control signals received from bus 330 to bus 332.

After exiting the segment isolation mode, the host computer 302 on near-side segment selects the expander 304 to determine if the far-side bus 332 is in a BUS FREE state (i.e., not BSY) in operation 510 exemplified by decision 512. If the far-side bus 332 is still BSY, this means the device causing the bus hang condition is located in either bus segment 312 or 314 because the BSY signal on the bus 332 has not been cleared. In this case, the host computer 302 causes the A expander 304 to issue a far-side reset signal to reset the far-side bus segment 312 in operation 514 in a manner similar to resetting the near-side bus segment 310. On the other hand, if the far-side bus 332 is not BSY, the device that caused the bus hang condition was in the near-side segment 310, which has already been reset. Thus, the bus hang condition has been cleared. It should be noted that the resetting and segment isolation operations continue one bus segment after another until a far-side bus is determined to be in a BUS FREE state, at which time the expander exits reset isolation mode and the method terminates in operation 516.

Figure 6:
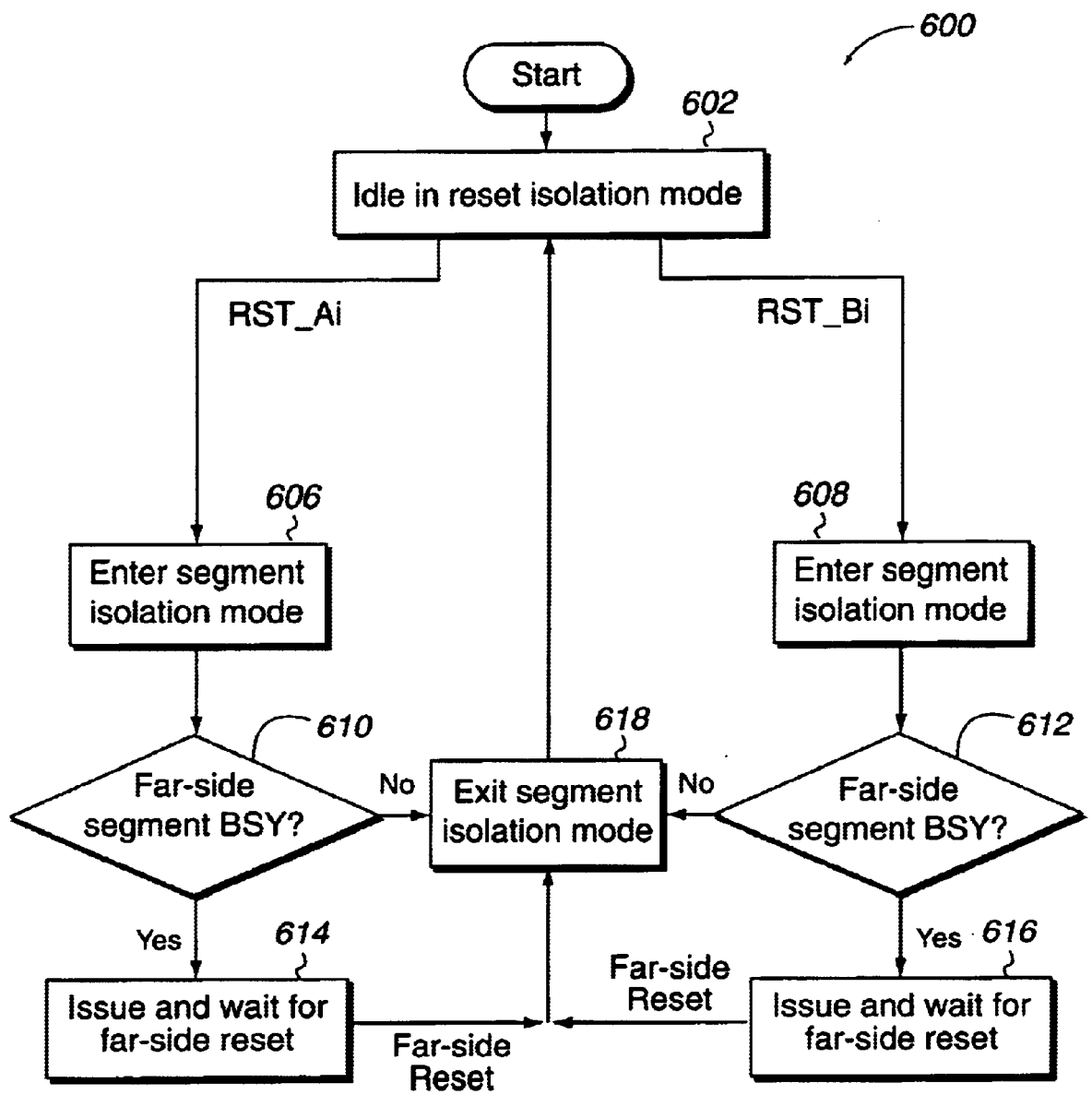
FIG. 6 shows an exemplary method implemented in the expander for performing reset and segment isolation in accordance with one embodiment of the present invention.

FIG. 6 shows an exemplary flow chart 600 of a method implemented in the expander 304 for performing reset and segment isolation in accordance with one embodiment of the present invention. Initially, the expander 304 is idle in a reset isolation mode where it has reset itself and disabled output reset buffers 412A and 422A in response to a reset signal RST. If the reset signal is from the bus segment 310, the expander 304 enters segment isolation mode in operation 606 by disabling output of signals received from one bus to the other. Then, it is determined if the other bus segment 330 is BSY in operation 610. If the far-side segment is not BSY, the expander 304 exits segment isolation mode in operation 618 and proceeds back to the idle mode in operation 602.

On the other hand, if the far-side segment 312 is BSY, the expander 304 issues a far-side reset to segment 312 and waits in operation 614 until the far-side segment 312 is reset. When the far-side segment 312 has been reset, the expander 304 exits segment isolation mode in operation 618 and proceeds back to operation. If the reset signal has been received from segment 312, however, the expander goes through operations 608, 612, 616, and 618, which are mirror the operations for reset signal received from segment 310.

The present invention thus allows reset of individual bus segments in an I/O subsystem one segment at a time without the reset propagating to other bus segments until the bus hang condition is cleared. Entering an isolation mode after reset isolation prevents a problem bus segment that is causing the bus hang condition from hanging the previously reset bus segment. When a far-side bus segment is still hung after resetting the near-side bus segment, the present invention allows reset of the far-side segment without resetting the near-side segment. When the far-side reset is issued, the expanders automatically exit segment isolation mode. The use of reset and segment isolation thus allows resetting of individual bus segments one segment at a time with attendant savings in cost and system complexity.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for resetting bus segments to clear bus hang in an I/O subsystem having a plurality of bus segments, each bus segment having a set of devices and a bus that is coupled to the set of devices, the I/O subsystem having at least one expander, each expander being arranged to couple a pair of buses for propagating communication signals, a first of the bus segments being coupled by a first one of the expanders only to a second of the bus segments, the method comprising the operations of:

a) asserting a first reset signal on only the first bus segment in a manner by which the first reset signal is normally transmitted through the first expander to the second bus segment;

b) in response to the first reset signal asserted on the first bus segment, resetting the first expander coupled to the first bus segment and resetting each device in the first bus segment and establishing a first reset isolation mode of the first expander to perform reset signal isolation such that the first reset signal is not propagated through the first expander to the second bus segment;

c) operating the first expander coupled to the first bus segment for:

c1) after resetting the first expander and the devices in the first bus segment, in a segment isolation mode of the first expander, isolating all the communication signals such that the first expander prevents propagation of the communication signals between the first bus segment and the second bus segment wherein a busy signal from the second bus segment will not propagate to the first bus segment and will not interrupt clearing of the first bus segment;

c2) determining whether the bus of the second bus segment is no longer hung;

c3) during the first reset isolation mode if the bus of the second bus segment is still hung, issuing a first far-side reset signal on the second bus segment to reset the second bus segment, propagation of the first far-side reset signal to the reset first bus segment being prevented by the first expander in the first reset isolation mode;

c4) if the bus of the second bus segment is not hung, allowing propagation of the communication signals between the first bus segment and the second bus segment; and c5) ending the first reset isolation mode of the first extender.

2. The method as recited in claim 1, wherein a third of the bus segments is coupled by a second of the expanders only to the second bus segment, and if the bus of the second bus segment is still hung, the method further comprises the following operations:

d) in response to the first far-side reset signal on the second bus segment, resetting the second expander coupled to the second bus segment and resetting each device in the second bus segment and establishing a second reset isolation mode of the second expander to perform far-side reset signal isolation such that the first far-side reset signal is not propagated through the second expander to the third bus segment.

3. The method as recited in claim 1, wherein each expander enters into a reset isolation mode in response to the respective reset signal.

4. The method as recited in claim 1, wherein the first expander exits the segment isolation mode so that when the second bus is not hung the first expander allows the propagation of communication signals between the first bus segment and the second bus segment.

5. The method as recited in claim 4, wherein a third of the bus segments is coupled by a second of the expanders only to the second bus segment, the method comprising the further operations of:

after the first expander exits the segment isolation mode and in further response to the first far-side reset signal on the second bus segment, establishing a second reset isolation mode of the second expander to perform reset signal isolation such that the first far-side reset signal is not propagated through the second expander to the third bus segment: and during the second reset isolation mode, if the bus of the third bus segment is still hung, issuing a second far-side reset signal on the third bus segment to reset the third bus segment, propagation of the second far-side reset signal to the reset second bus segment being prevented by the second expander in the second reset isolation mode;

wherein the first, second and third bus segments are reset one bus segment at a time starting with resetting the first bus segment and then resetting the second bus segment and then resetting the third bus segment.

6. The method as recited in claim 1, wherein a third of the bus segments is coupled by a second of the expanders only to the second bus segment, a host computer in the I/O subsystem on the first bus segment asserts the first reset signal only on the first bus segment, and the first expander in the first reset isolation mode isolates the first reset signal from being propagated through the first expander to the second and third bus segments.

7. The method as recited in claim 6, further comprising the operations of:

after resetting of the first and second bus segments, performing the following operations:

d) in response to the first far-side reset signal asserted on the second bus segment, resetting the second expander coupled to the second bus segment and establishing a second reset isolation mode of the second expander to perform reset signal isolation such that the first far-side reset signal is not propagated through the second expander to the third bus segment; and e) operating the second expander coupled to the second bus segment for:

e1) after resetting the second expander and the devices in the second bus segment, in a second segment isolation mode of the second expander, isolating all the communication signals such that the second expander prevents propagation of the communication signals between the second bus segment and the third bus segment, wherein a busy signal from the third bus segment will not propagate to the first bus segment and will not interrupt clearing of the first bus segment;

e2) determining whether the bus of the third bus segment is no longer hung; and e3) during the second reset isolation mode, if the bus of the third bus segment is still hung, issuing a second far-side reset signal on the third bus segment to reset the third bus segment, propagation of the second far-side reset signal to the reset second bus segment being prevented by the second expander in the second reset isolation mode.

8. An expander device for isolating a reset between a pair of bus segments in an I/O subsystem, each bus segment having a set of devices and a bus that is coupled to the set of devices, the expander device being arranged to couple the respective bus of a first bus segment of the pair only to the respective bus of a second bus segment of the pair for communication in the I/O subsystem, the expander device comprising:

a first I/O interface circuit configured to be coupled to the first bus segment, the first I/O interface circuit being adapted to interface input and output communication signals with the first bus segment;

a second I/O interface circuit configured to be coupled to the second bus segment and being adapted to interface the input and output communication signals with the second bus segment; and a first expander controller arranged to communicate the input and output communication signals between only the first and second I/O interface circuits, the first expander controller including a first reset and segment isolation controller coupled between only the first and second I/O interface circuits and adapted to isolate a reset signal received by the expander controller from the first bus segment through the first I/O interface circuit and to the first reset and segment isolator controller so that the reset signal does not propagate through the second I/O interface circuit to the second bus segment, the first reset and segment isolation controller being further adapted to cause the I/O interface circuits to isolate all signals to prevent propagation of the signals between the first and second bus segments during a period after isolating the reset signal until the bus in the first bus segment is cleared from a hang condition.

9. The expander device as recited in claim 8, wherein the first expander controller is adapted to be reset in response to the reset signal and wherein all devices in the first bus segment reset in response to the reset signal such that the bus in the first bus segment is cleared from the hang condition.

10. The expander device as recited in claim 8, wherein after clearing the first bus segment, if the bus in the second bus segment is still hung, the first expander controller issues a far-side reset signal to the bus in the second bus segment to reset the second bus segment, and the isolation of the reset signal prevents the propagation of the far-side reset signal to the first bus segment to prevent resetting of the devices in the first bus segment.

11. The expander device as recited in claim 10, wherein the expander device isolates a second reset between a second pair of bus segments in the I/O subsystem, the expander device further being arranged to couple the respective bus of the second bus segment only to the respective bus of a third bus segment of the second pair for communication in the I/O subsystem, the expander device further comprising:

a third I/O interface circuit configured to be coupled only to the second bus segment, the third I/O interface circuit being adapted to interface input and output communication signals with the second bus segment;

a fourth I/O interface circuit configured to be coupled only to the third bus segment and being adapted to interface the input and output communication signals with the third bus segment; and a second expander controller arranged to communicate the input and output communication signals between only the third and fourth I/O interface circuits, the second expander controller including a second reset and segment isolation controller coupled between only the third and fourth I/O interface circuits and adapted to isolate the far-side reset signal received on the second bus segment so that the far-side reset signal does not propagate through the fourth I/O interface circuit to the third bus segment, wherein the second reset and isolation controller is further adapted to cause the third and fourth I/O circuits to isolate all signals to prevent propagation of all the signals between the second and third bus segments during a second period after isolating the far-side reset signal until the bus in the second bus segment is cleared from a hang condition;

wherein the first and second bus segments are reset one bus segment at a time starting with the first bus segment and continuing to the hung second and third bus segment, wherein all of the resetting of the first, second, and third bus segments is in response to the first reset signal that was received on the first bus segment.

12. The expander device as recited in claim 11, wherein if the buses of the respective first and second bus segments are hung, then one after the other each of the respective first and second reset and segment isolation controllers generates a respective far-side reset isolation signal, which is provided to reset respective output buffers in the respective I/O interface circuits to disable propagation of the respective far-side reset signal from the first I/O interface circuit to the first bus segment and to disable propagation of the respective far-side reset signal from the third I/O interface circuit to the third bus segment.

13. The expander device as recited in claim 8, wherein the first expander controller allows propagation of all signals between the first and second bus segments when the bus in the second bus segment is cleared from the hang condition.

14. The expander device as recited in claim 8, wherein the first reset and segment isolation controller is further adapted to determine, after the period, whether the bus of the second bus segment is hung, and if not hung, to cause the I/O interface circuits to allow propagation of all the signals between the first and second bus segments.

15. An SCSI expander for resetting bus segments to clear bus hang in an SCSI I/O subsystem, each bus segment having a set of devices and a bus that is coupled to the set of devices, the SCSI expander being arranged to couple a first bus in a first bus segment and a second bus in a second bus segment, the SCSI expander being configured to repeat communication signals by receiving the communication signals from one SCSI bus segment and outputting the communication signals to the other SCSI bus segment, the SCSI expander comprising:

a first SCSI I/O interface circuit adapted to interface communication signals with the first SCSI bus segment;

a second SCSI I/O interface circuit adapted to interface the communication signals with the second SCSI bus segment; and an SCSI expander controller coupled to communicate the communication signals between only the first and second SCSI I/O interface circuits, the SCSI expander controller including a first reset and segment isolation controller coupled between only the first and second SCSI I/O interface circuits and adapted to operate in a reset isolation mode to isolate a reset signal received by the SCSI expander controller from on the first bus segment through the first SCSI interface circuit and to the first SCSI interface circuit and to prevent the reset signal from propagating to the second bus segment whether or not the second bus segment is in a bus hung condition, wherein the SCSI expander controller also operates in a segment isolation mode to isolate all communication signals to prevent propagation of the communication signals between the first and second bus segments during a period after isolating the reset signal until the first bus is in a BUS FREE state.

16. The SCSI expander as recited in claim 15, wherein the SCSI expander controller is adapted to be reset in response to the reset signal and wherein all devices in the first bus segment reset in response to the reset signal such that the first bus is in the BUS FREE state.

17. The SCSI expander as recited in claim 15, wherein if the second bus is still hung after the SCSI expander controller exits the segment isolation mode and during the reset isolation mode, the SCSI expander controller issues a far-side reset signal, the SCSI expander controller in the reset isolation mode allowing the far-side reset signal to be communicated to the second bus to reset the second bus segment and preventing the far-side reset signal from being communicated to the first bus segment wherein the far-side reset signal does not reset the first bus segment.

18. The SCSI expander as recited in claim 15, wherein:

the SCSI I/O subsystem includes a third bus segment having a third bus, and the SCSI expander is configured to couple the second bus in the second bus segment and the third bus in the third bus segment the SCSI expander further comprising:

respective third and fourth SCSI I/O interface circuits adapted to interface communication signals with the respective second and third SCSI bus segments; and an other SCSI expander controller coupled to communicate the communication signals between the third and fourth SCSI I/O interface circuits, the other SCSI expander controller being arranged to control communication between the second and third SCSI bus segments, the other SCSI expander controller including an other reset and segment isolation controller coupled between only the third and fourth SCSI I/O interface circuits and adapted to isolate a far-side reset signal received on the second bus segment to prevent the far-side reset signal from propagating to the third bus segment, wherein the first and second bus segments are reset one bus segment at a time starting with the first bus segment and next to the second bus segment, wherein all the resets are in response to the reset signal received on the first bus segment.

* * * * *